United States Patent
Chillar et al.

(10) Patent No.: US 8,056,318 B2
(45) Date of Patent: *Nov. 15, 2011

(54) SYSTEM FOR REDUCING THE SULFUR OXIDES EMISSIONS GENERATED BY A TURBOMACHINE

(75) Inventors: Rahul J. Chillar, Greenville, SC (US); Robert W. Taylor, Vedra Beach, FL (US); Peter Martin Maly, Lake Forest, CA (US); Sam Draper, Simpsonville, SC (US); Amit Toprani, Greenville, SC (US)

(73) Assignee: General Electric Company, Schenectady, NY (US)

(*) Notice: Subject to any disclaimer, the term of this patent is extended or adjusted under 35 U.S.C. 154(b) by 377 days.

This patent is subject to a terminal disclaimer.

(21) Appl. No.: 11/936,996

(22) Filed: Nov. 8, 2007

(65) Prior Publication Data

US 2009/0120088 A1 May 14, 2009

(51) Int. Cl.
*F02G 1/00* (2006.01)
*F02G 3/00* (2006.01)
*F02M 25/07* (2006.01)
*C10L 3/00* (2006.01)

(52) U.S. Cl. ...... 60/39.52; 60/39.12; 60/39.5; 60/605.2; 60/278

(58) Field of Classification Search .............. 60/605.2, 60/39.5, 39.52, 39.12, 278, 302, 311, 784, 60/649, 781, 755; 261/112.1; 422/171; 423/242.3, 423/235; F02M 25/07; F02B 37/00
See application file for complete search history.

(56) References Cited

U.S. PATENT DOCUMENTS

| | | | | |
|---|---|---|---|---|
| 2,469,679 A | * | 5/1949 | Wyman | 60/39.5 |
| 2,482,394 A | * | 9/1949 | Wyman | 60/39.281 |
| 3,768,234 A | * | 10/1973 | Hardison | 261/112.1 |
| 3,929,434 A | * | 12/1975 | Nelson | 95/236 |
| 4,184,322 A | * | 1/1980 | Paull et al. | 60/780 |
| 4,247,321 A | * | 1/1981 | Persinger | 423/235 |
| 4,269,806 A | * | 5/1981 | Yaguchi et al. | 422/171 |
| 4,337,231 A | * | 6/1982 | Yaguchi et al. | 423/242.3 |
| 4,357,801 A | * | 11/1982 | Wahl, III | 60/641.3 |
| 4,434,613 A | * | 3/1984 | Stahl | 60/39.52 |
| 4,492,085 A | * | 1/1985 | Stahl et al. | 60/649 |
| 4,753,784 A | * | 6/1988 | Neverman | 423/235 |
| 4,804,523 A | * | 2/1989 | Abrams et al. | 423/243.08 |

(Continued)

FOREIGN PATENT DOCUMENTS

JP 57073827 A * 5/1982 ............ 60/39.52

(Continued)

OTHER PUBLICATIONS

A Fully Certified English Translation JP 57-073827 A, published on May 8, 1982.*

*Primary Examiner* — Thai Ba Trieu
(74) *Attorney, Agent, or Firm* — Dale J. Davis; Ernest G. Cusick; Frank A. Landgraff

(57) ABSTRACT

A portion of the exhaust generated by a turbomachine is recirculated through an inlet portion by an exhaust gas recirculation system. The system reduces the level of Sulfur Oxides and other constituents within the exhaust before the exhaust is recirculated. The system may utilize sea water, fresh water, or combinations thereof; as part of a scrubbing process to reduce the Sulfur Oxides and other constituents.

25 Claims, 5 Drawing Sheets

U.S. PATENT DOCUMENTS

| | | | |
|---|---|---|---|
| 5,175,995 A * | 1/1993 | Pak et al. | 60/39.182 |
| 5,206,002 A * | 4/1993 | Skelley et al. | 423/235 |
| 5,316,737 A * | 5/1994 | Skelley et al. | 423/235 |
| 5,507,141 A * | 4/1996 | Stigsson | 60/775 |
| 5,590,519 A * | 1/1997 | Almlof et al. | 60/39.5 |
| 5,657,630 A * | 8/1997 | Kjemtrup et al. | 60/605.2 |
| 5,863,316 A * | 1/1999 | Lordo et al. | 55/338 |
| 5,955,037 A * | 9/1999 | Holst et al. | 422/171 |
| 6,202,400 B1 * | 3/2001 | Utamura et al. | 60/39.52 |
| 6,223,519 B1 * | 5/2001 | Basu et al. | 60/39.12 |
| 6,298,664 B1 * | 10/2001 | Åsen et al. | 60/649 |
| 6,301,888 B1 * | 10/2001 | Gray, Jr. | 60/605.2 |
| 6,470,682 B2 * | 10/2002 | Gray, Jr. | 60/605.2 |
| 6,637,183 B2 * | 10/2003 | Viteri et al. | 60/39.52 |
| 6,923,004 B2 * | 8/2005 | Chandran et al. | 60/781 |
| 7,007,487 B2 * | 3/2006 | Belokon et al. | 60/39.52 |
| 7,266,943 B2 * | 9/2007 | Kammel | 60/311 |
| 7,272,934 B2 * | 9/2007 | Chandran et al. | 60/781 |
| 7,285,350 B2 * | 10/2007 | Keefer et al. | 429/411 |
| 2004/0201289 A1 * | 10/2004 | Kayukawa et al. | 310/11 |
| 2005/0028529 A1 * | 2/2005 | Bartlett et al. | 60/39.52 |
| 2006/0207262 A1 * | 9/2006 | Firey | 60/784 |
| 2007/0034171 A1 * | 2/2007 | Griffin et al. | 122/479.1 |
| 2007/0277514 A1 * | 12/2007 | Kammel | 60/302 |
| 2008/0309087 A1 * | 12/2008 | Evulet et al. | 60/39.52 |
| 2009/0013867 A1 * | 1/2009 | McCutchen | 95/35 |
| 2009/0165377 A1 * | 7/2009 | Koh et al. | 60/39.52 |
| 2009/0241515 A1 * | 10/2009 | Cardno | 60/278 |
| 2009/0284013 A1 * | 11/2009 | Anand et al. | 60/39.5 |

FOREIGN PATENT DOCUMENTS

| | | |
|---|---|---|
| JP | 10082306 A * | 3/1998 |
| JP | 2002332919 A * | 11/2002 |
| WO | WO 9416992 A1 * | 8/1994 |

* cited by examiner

SYSTEM FOR REDUCING THE SULFUR OXIDES EMISSIONS GENERATED BY A TURBOMACHINE

BACKGROUND OF THE INVENTION

This application is related to commonly-assigned U.S. patent application Ser. No. 11/928,038, filed on 30 Oct. 2007.

The present invention relates to the exhaust gas emitted from a turbomachine, and more particularly to a system for reducing the sulfur oxides within the exhaust gas before recirculating the exhaust gas back into the turbomachine.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the emitted exhaust through an inlet portion of the turbomachine where it is mixed with the incoming airflow prior to combustion. This process facilitates the removal and sequestration of concentrated $CO_2$, and also reduces the NOx and SOx emission levels.

There are a few problems with the currently known EGR systems. Impurities and moisture within the exhaust gas prevent utilizing a simple re-circulating loop to reduce the generation of emissions, such as SOx emissions. Turbine fouling, corrosion, and accelerated wear of internal turbomachine components would result from introducing the exhaust gas directly to the turbomachine inlet portion. As a result, the diverted exhaust gas should be treated prior to blending with the inlet air.

For the foregoing reasons, there is a need for a system for reducing the level of SOx emissions within the recirculated exhaust gas stream. The system should minimize impact of the harmful constituents within the exhaust gas stream on turbomachine components.

BRIEF DESCRIPTION OF THE INVENTION

In accordance with an embodiment of the present invention, a system for reducing sulfur oxides (SOx) emissions within at least one exhaust stream of at least one turbomachine comprising an inlet portion and an exhaust portion; the system comprising: providing at least one exhaust gas recirculation system (EGR) comprising at least one EGR fan and an upstream heat exchanger, wherein the at least one EGR can: receive the at least one exhaust stream at a first temperature from the exhaust portion of the at least one turbomachine; wherein the at least one exhaust stream comprises SOx emissions at a first level; reduce the SOx emissions to a second level; and allow the at least one exhaust stream to enter the inlet portion at a second temperature; and wherein the at least one exhaust stream is a portion of the total exhaust exiting the at least one turbomachine; and wherein the upstream heat exchanger is located upstream of the at least one EGR fan.

DETAILED DESCRIPTION OF THE INVENTION

Figure 1:
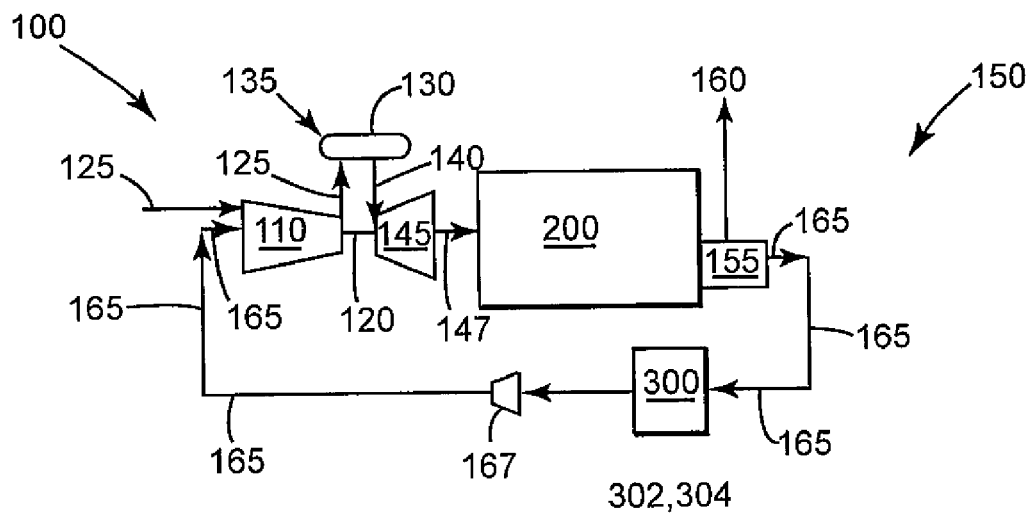
FIG. 1 is a schematic illustrating an example of a system for reducing SOx emissions in accordance with an embodiment of the present invention.

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, Words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention takes the form of a system that may reduce the level of SOx emissions by recirculating a portion of the exhaust of at least one turbomachine; the portion of exhaust may be mixed with the inlet air prior to re-entering the turbomachine, without affecting reliability and availability of the unit.

The present invention has the technical effect of reducing the levels of SOx, NOx, concentrated $CO_2$, and other harmful constituents, all of which may be within a portion of the exhaust (hereinafter "exhaust stream", or the like). These levels may be reduced from a first level to a second level. The present invention may incorporate two methods of reducing the levels of SOx, NOx, concentrated $CO_2$, and other harmful constituents.

The present invention may reduce the temperature of the exhaust stream to a saturation temperature where the aforementioned constituents may condense and then be removed. The present invention may also reduce the temperature of, and use a scrubbing process (or the like), on the exhaust stream temperature.

The present invention may be applied to the variety of turbomachines that produce a gaseous fluid, such as, but not limiting of, a heavy duty gas turbine; an aero-derivative gas turbine; or the like (hereinafter referred to as "gas turbine"). An embodiment of the present invention may be applied to either a single gas turbine or a Plurality of gas turbines. An embodiment of the present invention may be applied to a gas turbine operating in a simple cycle or a combined cycle configuration.

Generally, the exhaust gas recirculation system of an embodiment of the present invention comprises multiple elements. The configuration and sequence of the elements may be dictated by the composition of the exhaust gas and the type of cooling fluid used. In general the steps comprising the exhaust gas re-circulation process are: cooling, constituent reduction, and mixing. When the present invention is utilized, the diverted gas, blended with inlet air, can be introduced to the turbine inlet without harm. As described below, there are multiple arrangements that may be used to accomplish the exhaust gas treatment.

As described below, an embodiment of the present invention may utilize at least one EGR fan and an upstream heat exchanger; at least one EGR fan, an upstream heat exchanger, and at one scrubber; or at least one EGR fan, an upstream heat exchanger, at one scrubber, and at least one downstream heat exchanger.

Any of the embodiments of the present invention may include a plurality of damper doors that may prevent a back-flow of the exhaust stream into a portion of the turbomachine. Also, any of the embodiments may also include at least one injector that may introduce a reagent for reducing the level of harmful constituents within the exhaust stream; and at least one wet electrostatic precipitator for removing the aforementioned constituents including sulfite particles.

Although the present invention describes using at least one scrubber for removing SOx compounds and possibly for reducing the temperature of the exhaust stream, other means may be used. For example, but not limiting of, other absorber vessels including: a spray tower, evaporative gas conditioning tower, or the like, may be used to perform the functions of the scrubber.

In the embodiments of the present invention described below, the scrubber may use a scrubber fluid that may include: fresh water, sea water, or combinations thereof.

Generally, the composition of sea water is dynamic between and within individual sources. Variations in alkalinity of the sea water may affect the efficiency of removing the SOx and may also effect the flow rates of the fluids used within the scrubber (hereinafter "scrubber fluids"). To minimize the impact of the scrubber fluid characteristics on the performance of the EGR 150, an embodiment of the present invention may blend sea water and fresh water prior to introduction into the at least one scrubber 170. The blended fluid may minimize the impact of variations in the sea water composition.

The elements of the present invention, such as, but not limiting of, a EGR fan, scrubber, and heat exchanger (s) may be fabricated of any materials that can withstand the operating environment under which the exhaust gas recirculation system may function and operate.

Referring now to the Figures, where the various numbers represent like elements throughout the several views, FIG. 1 is a schematic illustrating an example of a system for reducing SOx emissions in accordance in accordance with an embodiment of the present invention. FIG. 1 illustrates a gas turbine 100, a heat recovery steam generator (HRSG) 200, and an exhaust gas recirculation system 150.

Alternatively, the exhaust gas recirculation system 150 may be utilized on a gas turbine 100 located on a site that does not have the HRSG 200.

The gas turbine 100 comprises a compressor 110 having a shaft 120. Air enters the inlet of the compressor at 125, is compressed by the compressor 110, and then discharged to a combustion system 130, where a fuel 135 such as, but not limiting of, natural gas is burned to provide high-energy combustion gases 140 which drive the turbine 145. In the turbine 145, the energy of the hot gases is converted into work, some of which is used to drive the compressor 110 through the shaft 120, with the remainder being available for useful work to drive a load (not illustrated).

The exhaust gas recirculation system 150, as illustrated in FIG. 1, comprises at least one EGR damper 155; at least one upstream heat exchanger 300; and at least one EGR fan 167.

The at least one EGR damper 155 may apportion the total exhaust flow 147 between a non-recirculated exhaust 160 and at least one exhaust stream 165. The at least one EGR damper 155 may be of a size and fabricated of a material capable of withstanding the physical properties of the at least one exhaust stream 165, such as, but not limiting of, a flowrate of about 10000 Lb/hr to about 50000000 Lb/hr and a temperature of about 100 Degrees Fahrenheit to about 1500 Degrees Fahrenheit.

An operator of the gas turbine 100, may determine the position of the at least one EGR damper 155 based on the desired flowrate of the at least one exhaust stream 165. The at least one exhaust stream 165 may flow downstream of the at least one EGR damper 155 to an inlet portion of the at least one upstream heat exchanger 300.

The at least one upstream heat exchanger 300 may be located downstream of the at least one EGR damper 155 and may receive the at least one exhaust stream 165 exiting the EGR damper 155. The at least one upstream heat exchanger 300 and the at least one downstream heat exchanger 220 (not illustrated in FIG. 1), may either solely or work in tandem to lower the temperature of the at least one exhaust stream 165 to below a saturation temperature. This may allow for the condensing of the portion of the at least one exhaust stream 165 (hereinafter "condensate") that may include the harmful constituents described above. Each heat exchanger 220, 300 includes a condensate collection system (not illustrated) that allows for removal of the particulates, which are captured by the condensate.

Therefore, the at least one upstream heat exchanger 300 may cool the at least one exhaust stream 165 to a range of about 60 degrees Fahrenheit to about 100 degrees Fahrenheit.

The at least one upstream heat exchanger 300 may receive and then discharge an upstream cooling fluid 302, 304; which may be of a type that allows for the amount of heat transfer required to lower the temperature of the at least one exhaust stream 165, as discussed The at least one EGR fan 167 serves to overcome the pressure drop of the EGR system 150. Thus, the at least one EGR fan 167 may allow for the at least one exhaust stream 165 to flow throughout the EGR system 150. The at least one scrubber 170 may also remove a portion of the SOx emissions within the at least one exhaust stream 165, from a first level to a second level. In an embodiment of the present invention an operator of the at least one turbomachine may determine the requirements of the second level.

After flowing through the at least one ECR fan 167, the at least one exhaust stream 165 may flow downstream to the compressor 110. The exhaust gas recirculation system 150 may then mix the inlet air 125 with the at least one exhaust stream 165, prior to the compression performed by the compressor 110.

In use, the exhaust gas recirculation system 150 of the above described embodiment of the present invention functions during the operation of the gas turbine 100. The EGR damper 155 may be positioned to allow for the desired flow-rate of the at least one exhaust stream 165, and the non-recirculated exhaust 160 may flow through an exhaust stack (not illustrated), or the like. The at least one exhaust stream 165 may then flow downstream through the at least one upstream heat exchanger 300, as described above. In the at least one upstream heat exchanger 300, the temperature of the at least one exhaust stream 165, may be lowered to a temperature range allowing for the reduction of the SOx emissions from a first level to a second level. The at least one exhaust stream 165 may then flow to the at least one EGR fan 167 and then downstream into the compressor 110.

The alternate embodiments of the present invention discussed below, and illustrated in FIGS. 2 through 5, modify the flow path of the at least one exhaust stream 165 and the configuration of the exhaust gas recirculation system 150. The discussion of each embodiment will emphasize the differences from the embodiment discussed above.

Figure 2:
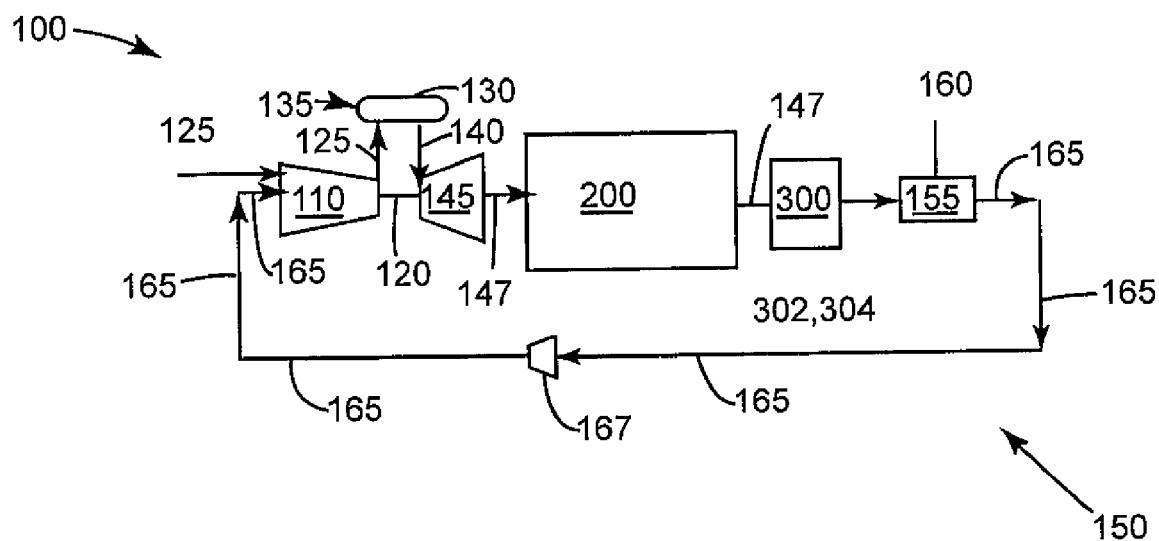
FIG. 2 is a schematic illustrating an example of a system for reducing SOx emissions in accordance with a second embodiment of the present invention.

FIG. 2 is a schematic illustrating an example of a system for reducing SOx emissions in accordance with a second embodiment of the present invention. As illustrated in FIG. 2, the primary difference between this second embodiment and the first embodiment is the location of the at least one upstream heat exchanger 300. In this second embodiment, the at least one upstream heat exchanger 300 may be located downstream of the HRSG 200 and upstream of the at least one EGR damper 155. This configuration may allow for greater heat extraction from the total exhaust flow 147. Then the non-recirculated exhaust 160, may be used elsewhere such as, but not limiting of, in a boiler that may generate steam for a process and/or power generation.

Figure 3:
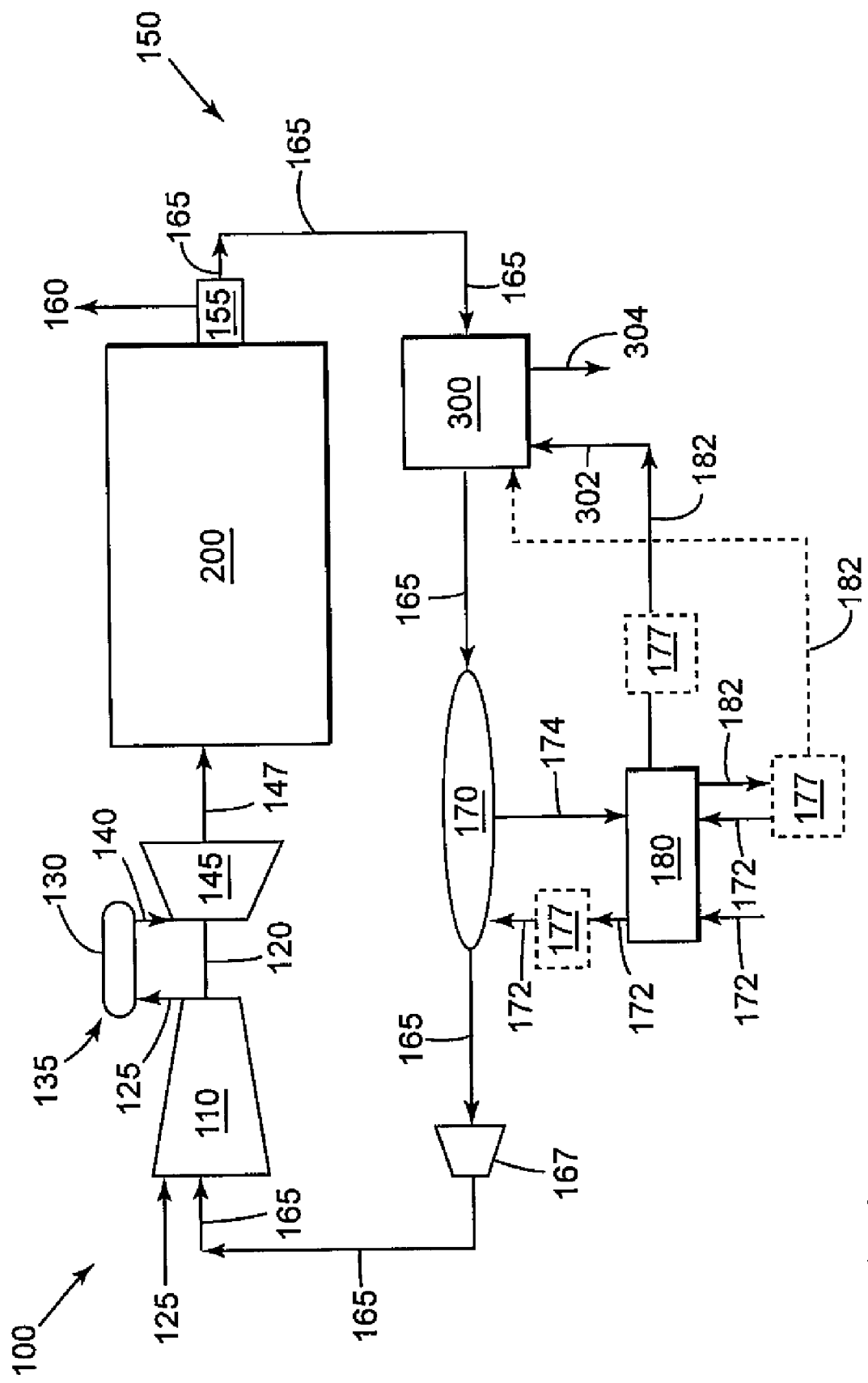
FIG. 3 is a schematic illustrating an example of a system for reducing SOx emissions in accordance with a third embodiment of the present invention.

FIG. 3 is a schematic illustrating an example of a system for reducing SOx emissions in accordance with a third embodiment of the present invention. In this third embodiment of the present invention, the exhaust gas recirculation system 150 may include: at least one EGR damper 155; at least one upstream heat exchanger 300; at least one scrubber 170; a recirculation tank 180; and at least one EGR fan 167.

The at least one EGR damper 155, and at least one upstream heat exchanger 300, may function as previously described.

A scrubber system (hereinafter "scrubber") is generally considered an air pollution control device that may remove particulates and/or other emissions from industrial exhaust streams. A scrubber may use a "scrubbing process", or the like, involving a liquid to "scrub" unwanted pollutants from a gas stream.

The at least one scrubber 170 may receive and then later discharge a scrubber fluid 172,174; which may be of a type that allows for the heat transfer required to lower the temperature of the at least one exhaust stream 165, as discussed. The scrubber fluid 172, 174 generally absorbs a portion of the harmful constituents within the at least one exhaust stream 165.

In this third embodiment of the present invention, the scrubber fluid 172,174 may be fresh water. The fresh water may be supplied from a natural source, such as, but not limiting of, a fresh water lake or well. The fresh water may also be supplied by a governmental source, such as, but not limiting of, a municipal water system, or the like.

In an embodiment of the present invention the at least one scrubber 170 may be horizontally positioned, which may allow for the handling of large volumes of the at least one exhaust stream 165 in an economically and efficiently manner. The horizontality positioned scrubber 170 may also be cheaper to fabricate, easier to install, and cheaper to service than a similar vertically positioned scrubber.

In an embodiment of the present invention the at least one scrubber 170 may reduce SOx emissions from a first level to a second level. For example, but not limiting of, the SOx emissions reduction may include the first level at a range of about 10 parts per billion by weight to about 100 parts per billion by weight; and the second level at a range of about 0.1 parts per billion by weight to about 20 parts per billion by weight.

The at least one scrubber 170 may also remove a portion of the plurality of constituents (not illustrated) within the at least one exhaust stream 165, from a first level to a second level. In an embodiment of the present invention an operator of the at least one turbomachine may determine the requirements of the second level. The constituents may include for example, but not limiting of, at least one of: NOx, $CO_2$, water, chloride ions, acids, aldehydes, hydrocarbons, or combinations thereof.

The exhaust gas recirculation system 150 may require that the at least one scrubber 170 provide high flow rates. In an embodiment of the present invention a recirculation tank 180 may be used to increase the flow rate of the scrubber fluid 172, 174. As illustrated, a portion 174 of the scrubber fluid 172, 174 may flow into the recirculation tank 180 and then re-enter the at least one scrubber 170 via line 172.

Depending on the source of the fresh water, at least one water purification device 177, may be integrated with the at least one scrubber 170 or the recirculation tank 180. The at least one water purification device 177 may remove harmful containments possibly existing in the fresh water. As illustrated, the at least one water purification device 177 may be located adjacent to an inlet portion of the scrubber 170, adjacent to an inlet portion of the recirculation tank 180, and/or adjacent a discharge portion of the recirculation tank 180.

The present invention may reduce the amount of new water supplied to the exhaust gas recirculation system 150, by allowing the a recirculation tank discharge 182 from the recirculation tank 180 to function as a cooling fluid supply to the at least one upstream heat exchanger 300. Here, for example, but not limiting of, the recirculation tank discharge 182 may form an independent flow path into the at least one upstream heat exchanger 300. Alternatively, the recirculation tank discharge 182 may be mixed with the upstream cooling fluid supply path 302.

Integrating the recirculation tank discharge 182 with the at least one upstream heat exchanger 300 may increase the overall efficiency the exhaust gas recirculation system 150.

After the scrubbing process, the at least one exhaust stream 165 may flow downstream to the at least one EGR fan 167, as previously described. The exhaust gas recirculation system 150 may then mix the inlet air 125 with the at least one exhaust stream 165, prior to the compression performed by the compressor 110, as previously described.

In use, the exhaust gas recirculation system 150 of the above described embodiment of the present invention functions during the operation of the gas turbine 100. The EGR damper 155 may be positioned to allow for the desired flowrate of the at least one exhaust stream 165, and the non-recirculated exhaust 160 may flow through an exhaust stack (not illustrated), or the like. The at least one exhaust stream 165 may then flow downstream through the at least one upstream heat exchanger 300, as described above. In the at least one upstream heat exchanger 300, the temperature of the at least one exhaust stream 165, may be lowered to a temperature range allowing for the reduction of SOx emissions from a first level to a second level.

Next, the at least one exhaust stream 165 may then flow to at least one scrubber 170. In the at least one scrubber 170, the temperature of the at least one exhaust stream 165 may be lowered to below the saturation temperature. The use of the scrubber fluid 172, 174, may flow through the recirculation tank 180, where at least one water purification device 177 may remove harmful constituents within the fresh water.

Next, the at least one exhaust stream 165 may flow downstream of the at least one scrubber 170 to the at least one EGR fan 167 and then downstream into the compressor 10.

Figure 4:
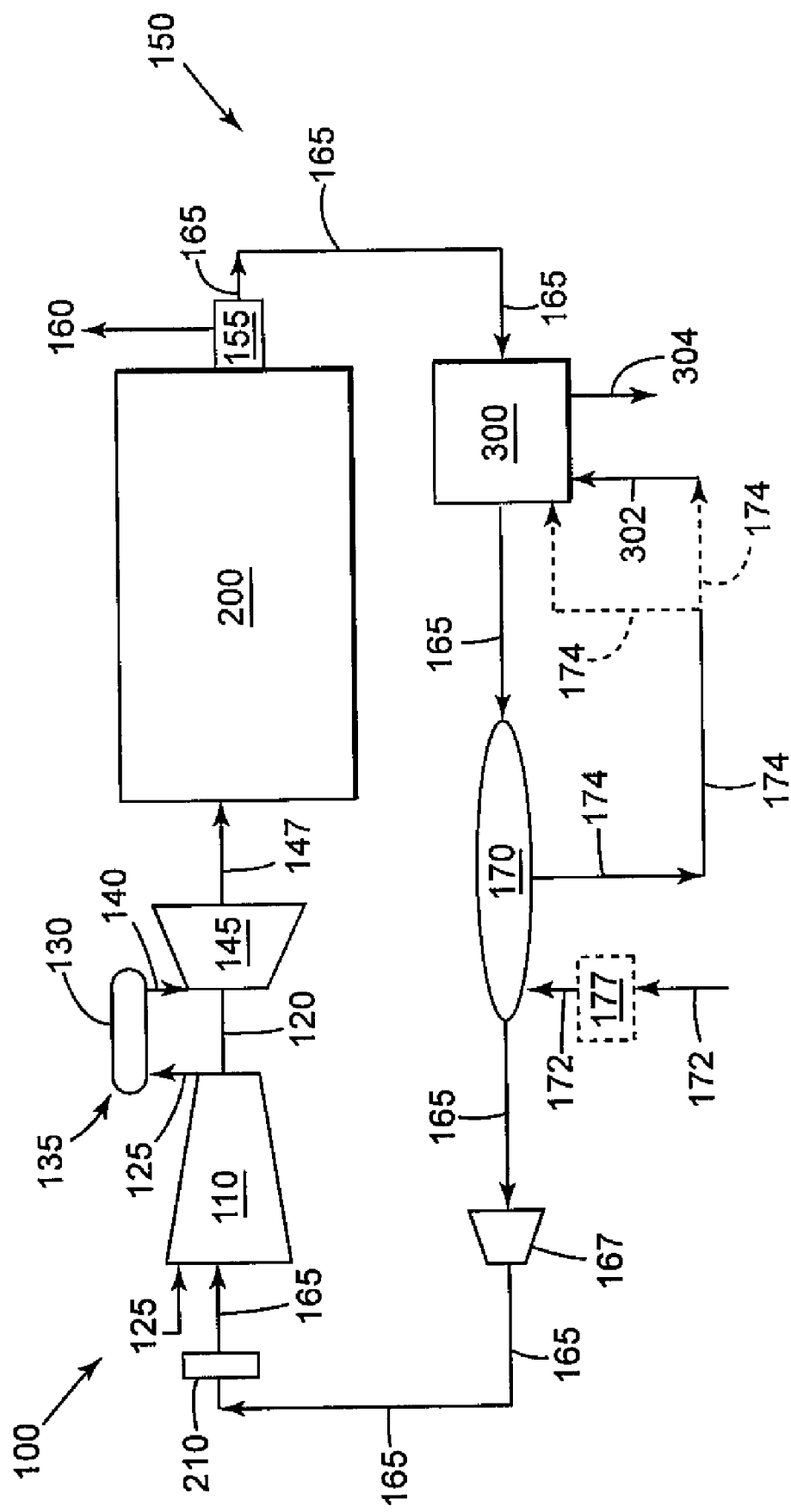
FIG. 4 is a schematic illustrating an example of a system for reducing SOx emissions in accordance with a fourth embodiment of the present invention.

FIG. 4 is a schematic illustrating an example of a system for reducing SOx emissions in accordance with a fourth embodiment of the present invention.

The key difference between this fourth embodiment and the third embodiment of the present invention is that sea water as opposed to fresh water is used as the scrubber fluid within the at least one scrubber 170 in this fourth embodiment. In this fourth embodiment of the present invention, the exhaust gas recirculation system 150 may include: at least one EGR damper 155; at least one upstream heat exchanger 300; at least one scrubber 170; at least one EGR fan 167; and at least one filter 210.

The at least one EGR damper 155, and at least one upstream heat exchanger 300, may function as previously described.

As discussed, a scrubber may use a "scrubbing process", or the like, involving a liquid to "scrub" unwanted pollutants from a gas stream. A scrubber utilizing sea water may not require reagents. Instead seawater alkalinity, or buffering capacity, is used to neutralize the exhaust gas SOx.

The at least one scrubber 170 may be horizontally positioned, as discussed; and may receive and then later discharge a scrubber fluid 172, 174; which may be of a type that allows for the heat transfer required to lower the temperature of the at least one exhaust stream 165, as discussed. In this fourth embodiment of the present invention, the scrubber fluid 172, 174 is sea water.

The present invention may reduce the amount of new water supplied to the exhaust gas recirculation system 150, by allowing the discharge 174 of the scrubber fluid 172, 174 to be a cooling fluid supply to the at least one upstream heat exchanger 300. Here, for example, but not limiting of, the discharge 174 may form an independent flow path into the at least one upstream heat exchanger 300. Alternatively, the discharge 174 may be mixed with the upstream cooling fluid supply path 302.

Integrating the discharge 174 with the at least one upstream heat exchanger 300 may increase the overall efficiency the exhaust gas recirculation system 150.

In an embodiment of the present invention the at least one scrubber 170 may reduce SOx emissions from a first level to a second level, as discussed. For example, but not limiting of, the SOx emission reduction may include the first level at a range of about 10 parts per billion by weight to about 100 parts per billion by weight; and the second level at a range of about 0.1 parts per billion by weight to about 20 parts per billion by weight.

The at least one scrubber 170 may also remove a portion of the plurality of constituents (not illustrated) within the at least one exhaust stream 165, from a first level to a second level.

Depending on the source of the sea water, at least one water purification device 177, may be integrated with the at least one scrubber 170. The at least one water purification device 177 may remove harmful containments possibly existing in the sea water, as discussed. As illustrated, the at least one water purification device 177 may be located adjacent an inlet portion of the scrubber 170.

After the scrubbing process, the at least one exhaust stream 165 may flow downstream to the at least one EGR fan 167, as previously described. The exhaust gas recirculation system 150 may then flow downstream to least one filter 210, which may be a supplement to any existing filter or filter system utilized by the gas turbine 100, such as, but not limiting of, an inlet filter system. The at least one filter 210 may serve as a demister to remove entrained water, which may contain salt and acid species that may negatively impact the inlet of the gas turbine 100. The at least one filter 210 may also remove salts.

Sea water includes naturally occurring salts that aid in the removal of SOx. However, these salts should removed from the at least one exhaust stream 165 prior to entering the compressor 110 of the gas turbine 100. The at least one filter 210 may include a high-chloride component, or the like for removal of the salts.

After flowing through the at least one filter 210, the at least one exhaust stream 165 may then mix with the inlet air 125, prior to the compression performed by the compressor 110, as previously described.

In use, the exhaust gas recirculation system 150 of the above described embodiment of the present invention functions during the operation of the gas turbine 100. The ECR damper 155 may be positioned to allow for the desired flowrate of the at least one exhaust stream 165, and the non-recirculated exhaust 160 may flow through an exhaust stack (not illustrated), or the like. The at least one exhaust stream 165 may then flow downstream through the at least one upstream heat exchanger 300, as described above. In the at least one upstream heat exchanger 300, the temperature of the at least one exhaust stream 165, may be lowered to a temperature range allowing for the reduction of SOx emissions from a first level to a second level.

Next, the at least one exhaust stream 165 may then flow to at least one scrubber 170. In the at least one scrubber 170, the temperature of the at least one exhaust stream 165 may be lower to below the saturation temperature. The use of the scrubber fluid 172, 174, may flow through the recirculation tank 180, where at least one water purification device 177 may remove the harmful constituents within the sea water.

Next, the at least one exhaust stream 165 may flow downstream of the at least one scrubber 170 to the at least one EGR fan 167, then through the at least one filter 210, and then downstream into the compressor 110.

Figure 5:
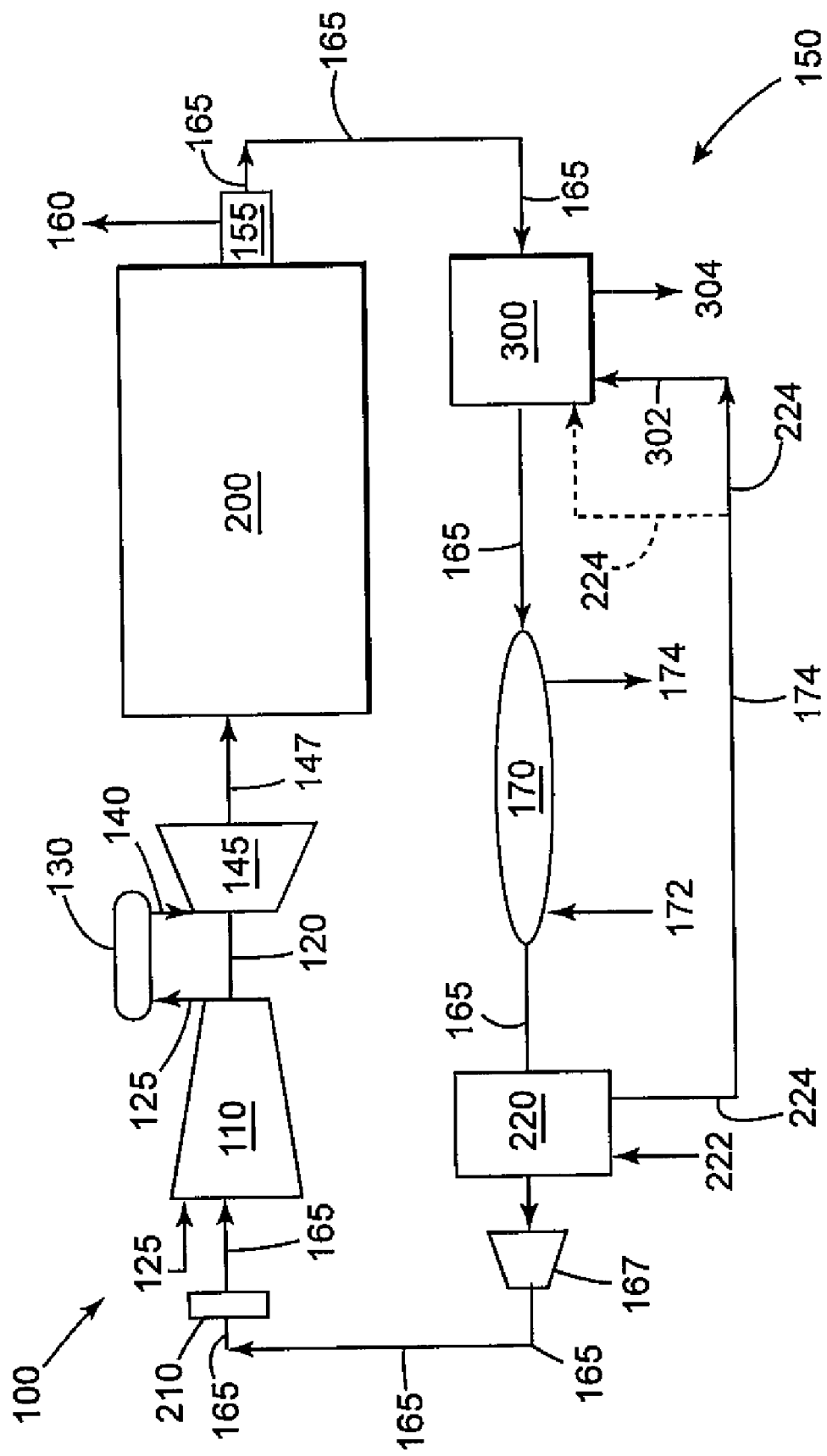
FIG. 5 is a schematic illustrating an example of a system for reducing SOx emissions in accordance with a fifth embodiment of the present invention.

FIG. 5 is a schematic illustrating an example of a system for reducing SOx emissions in accordance with a fifth embodiment of the present invention.

The configuration of this fifth embodiment of the present invention may allow the heat removal from the at least one exhaust stream 165, to be accomplished by multiple heat exchangers located up and down stream of the at least one scrubber 170.

The key difference between this fifth embodiment and the fourth embodiment of the present invention is the inclusion of the at least one downstream heat exchanger 220 within the exhaust gas recirculation system 150. A benefit of using multiple heat exchanges includes minimizing the impact of corrosion on the primary heat exchanger, the at least one upstream heat exchanger 300 in the present embodiment. The secondary heat exchanger, the at least one downstream heat exchanger 220, in the present embodiment, may further reduce the temperature of the at least one exhaust stream 165 after the majority of harmful constituents have been removed. This configuration may allow for relatively smaller heat exchangers than those of the previously described embodiments.

As illustrated in FIG. 5, another benefit of utilizing multiple heat exchangers is the reducing the amount of new water supplied to the exhaust gas recirculation system 150. The discharge 224 of the at least one downstream heat exchanger 220 may be purified and then mixed with the upstream cooling fluid 302 for the at least one upstream heat exchanger 300.

In this fifth embodiment of the present invention, the exhaust gas recirculation system 150 may include: at least one EGR damper 155; at least one upstream heat exchanger 300; at least one scrubber 170; at least one downstream heat exchanger 220; at least one EGR fan 167; and at least one filter 210; all of which were previously discussed except for the at least one downstream heat exchanger 220, which is discussed below.

The at least one downstream heat exchanger 220 may be located downstream of the at least one scrubber 170 and upstream of the at least one EGR fan 167. The at least one downstream heat exchanger 220 may cool the at least one exhaust stream 165 to a reasonable temperature such that the performance of the gas turbine 100 may not be impacted due to a hot inlet air. For example, but not limiting of, the at least one downstream heat exchanger 220 may reduce the temperature of the at least one exhaust stream 165 to a range of about 35 degrees (roughly above a freezing temperature) Fahrenheit to about 100 degrees Fahrenheit.

The at least one downstream heat exchanger 220 may receive and then later discharge a downstream cooling fluid 222,224; which may be of a type that allows for the amount of heat transfer required to lower the temperature of the at least one exhaust stream 165.

As illustrated, the discharge 224 of the downstream cooling fluid 222,224 may provide a cooling fluid supply to the at least one upstream heat exchanger 300. Here, for example, but not limiting of, the discharge 224 may form an independent flow path into the at least one upstream heat exchanger 300. Alternatively, the discharge 224 may be mixed with the upstream cooling fluid supply path 302.

Integrating the discharge 224 with the at least one upstream heat exchanger 300 may increase the overall efficiency the exhaust gas recirculation system 150.

The fifth embodiment of the present invention may integrate the operation of the at least one upstream heat exchanger 300, at least one downstream heat exchanger 220, and at least one scrubber 170; to remove heat from, and thus lower the temperature of, the at least one exhaust stream 165 in stages, as described next.

In use, the exhaust gas recirculation system 150 of the fifth embodiment of the present invention functions while the gas turbine 100 is in operation. The EGR damper 155 may be positioned to allow for the desired flowrate of the at least one exhaust stream 165, as previously described. The at least one exhaust stream 165 may then flow downstream through the at least one upstream heat exchanger 300, which may lower the temperature of the at least one exhaust stream 165 to a range of about 120 degrees Fahrenheit to about 150 degrees Fahrenheit.

Next, the at least one exhaust stream 165 may then flow downstream to the at least one scrubber 170, as described above. The at least one exhaust stream 165 may then flow downstream of the at least one scrubber 170 through the at least one downstream heat exchanger 220, which may lower the temperature of the at least one exhaust stream 165 to a range of about 60 degrees Fahrenheit to about 100 degrees Fahrenheit.

Next, the at least one exhaust stream 165 may flow downstream of the at least one scrubber 170 to the at least one EGR fan 167, then through the at least one filter 210, and then downstream into the compressor 110.

Figure 6:
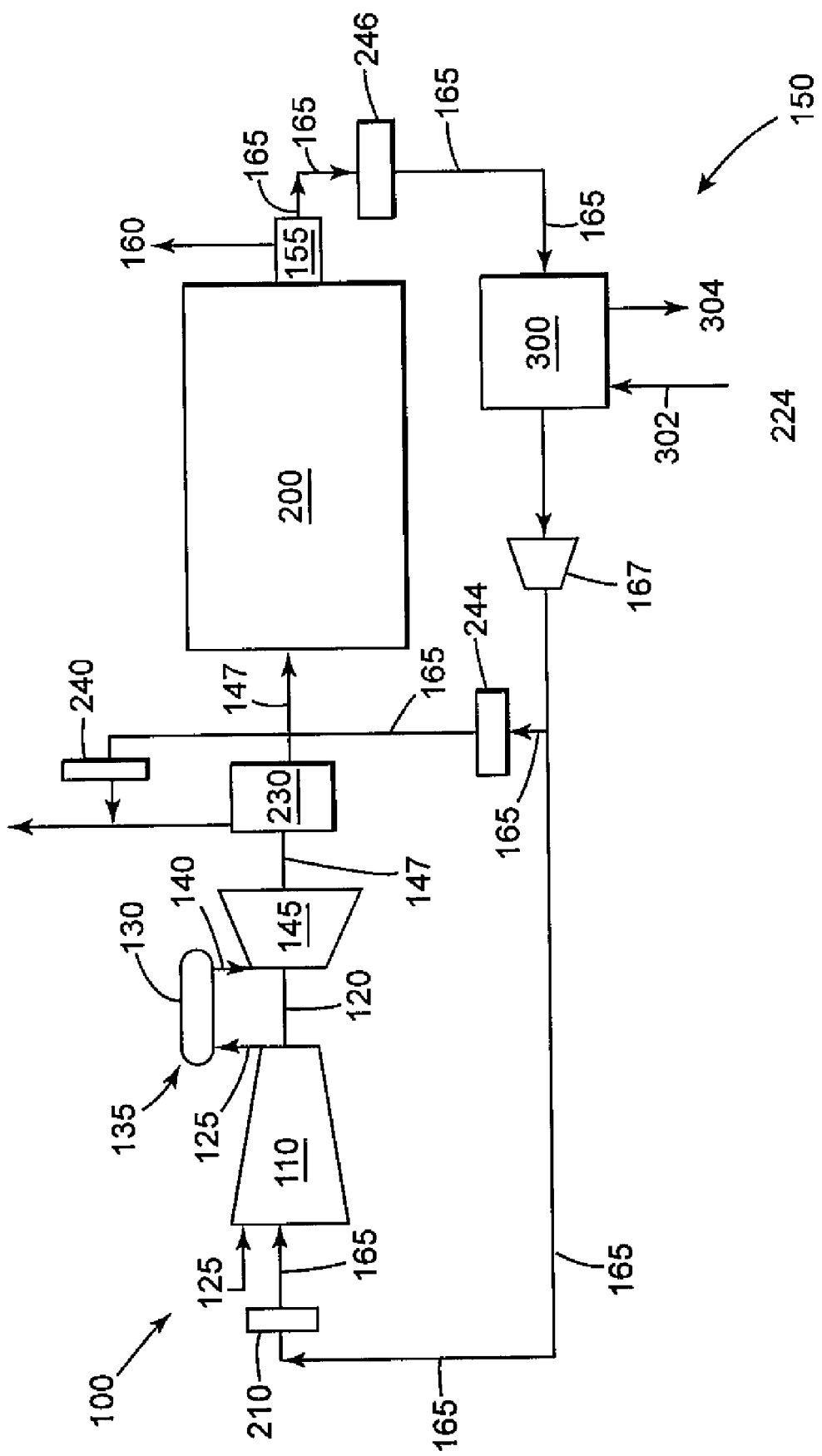
FIG. 6 is a schematic illustrating an example of a system for reducing SOx emissions in accordance with a sixth embodiment of the present invention.

FIG. 6 is a schematic illustrating an example of a system for reducing SOx emissions in accordance with a sixth embodiment of the present invention. The key difference between this sixth embodiment and all previous embodiments of the present invention is the inclusion of a plurality of damper doors 240, 244, 246 and a bypass stack 230 within the exhaust gas recirculation system 150. The features of this sixth embodiment may be incorporated into any of the previously described embodiments of the present invention.

The bypass stack 230 and plurality of damper doors 240, 244, 246 may be used in conjunction with the at least one EGR damper 155 to bring the exhaust gas recirculation system 150 up to full EGR system flow. The bypass stack 230 and plurality of damper doors 240, 244, 246 may allow for internal access to, and decrease the overall cooling time of, the exhaust gas recirculation system 150. The bypass stack 230 and plurality of damper doors 240, 244, 246 may also serve to decouple the speed and operability of the gas turbine 100 from the speed and operability of the exhaust gas recirculation system 150.

Each of the plurality of damper doors 240, 244, 246 may comprises a check valve; which may reduce the possibility of a backflow of the at least one exhaust stream 165 into the gas turbine 100.

Damper doors 244 may operate in manner to protect the compressor 110 from ingesting during a failure of the exhaust gas recirculation system 150. Damper door 246 may protect the exhaust gas recirculation system 150, when not in operation, from receiving the at least one exhaust stream 165.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for reducing sulfur oxides (SOx) within at least one an exhaust stream generated by at least one a turbomachine, the system comprising:
    at least one turbomachine comprising: an inlet, a compressor, an external combustion system, and a turbine section; which operatively produces the exhaust stream;
    a heat recovery steam generator (HRSG) installed downstream of the at least one turbomachine, wherein the exhaust stream flows from the at least one turbomachine to an inlet portion of the HRSG;
    an EGR damper located downstream of the at least one turbomachine, wherein the EGR damper comprises structure for diverting the exhaust stream;
    an exhaust gas recirculation (EGR) system integrated with the at least one turbomachine and fluidly located downstream of the EGR damper, wherein the EGR system comprises at least one damper door, a pollution control device, at least one EGR fan and an upstream heat exchanger, wherein operatively the EGR system:
        receives the exhaust stream at a first temperature from the at least one turbomachine; wherein the exhaust stream comprises SOx at a first level;

reduces a temperature of the exhaust stream to below a saturation temperature so that constituents condense out of the exhaust stream; and utilizes the pollution control device to reduce the SOx to a second level; wherein the pollution control device uses sea water to remove SOx compounds from the exhaust stream; and directs the exhaust stream towards the inlet at a second temperature;

wherein the system recirculates the exhaust stream exiting the EGR system to the inlet of the at least one turbomachine;

wherein the upstream heat exchanger is located upstream of the at least one EGR fan and wherein the exhaust stream flows from an outlet portion of the HRSG to an inlet portion of the upstream heat exchanger.

2. The system of claim 1, wherein the exhaust stream comprises a flowrate of about 10,000 pounds per hour to about 50,000,000 pounds per hour and a temperature of about 100 degrees Fahrenheit to about 1500 degrees Fahrenheit; wherein the at least one turbomachine controls cooperation of the combustion system and turbine section, which then collectively determine the magnitudes of the flowrate and the temperature.

3. The system of claim 1, wherein the exhaust gas recirculation system reduces constituents within the exhaust stream from a first level to a second level, wherein the constituents comprise at least one of: NOx, CO2, water, chloride ions, acids, aldehydes, hydrocarbons, or combinations thereof.

4. The system of claim 1, the at least one damper door comprises a plurality of damper doors for preventing a backflow of the exhaust stream into the at least one turbomachine.

5. The system of claim 1, wherein the first level of the SOx comprises a range of about 10 parts per billion by weight to about 100 parts per billion by weight.

6. A system for reducing sulfur oxides (SOx) within an exhaust stream generated by at least one gas turbine; the system comprising:

the at least one gas turbine comprising: an inlet, a compressor, an external combustion system, and a turbine section; which operatively produces the exhaust stream;

a heat recovery steam generator (HRSG) installed downstream of the at least one gas turbine, wherein the exhaust stream flows from the gas turbine to an inlet portion of the HRSG;

an EGR damper located downstream of the at least one gas turbine, wherein the EGR damper comprises structure for diverting the exhaust stream;

an exhaust gas recirculation (EGR) system integrated with the at least one gas turbine and fluidly located downstream of the EGR damper, wherein the EGR system comprises at least one damper door, a pollution control device, an EGR fan and an upstream heat exchanger, wherein operatively the EGR system:

receives the exhaust stream at a first temperature from the EGR damper;

wherein the exhaust stream comprises SOx at a first level;

lowers a temperature of the exhaust stream to below a saturation temperature so that constituents condense out of the exhaust stream;

utilizes the pollution control device to reduce the SOx to a second level;

wherein the pollution control device uses sea water to remove SOx compounds from the exhaust stream; and directs the exhaust stream towards the inlet at a second temperature;

wherein the EGR system recirculates the exhaust stream exiting the EGR system to the inlet of the at least one gas turbine;

wherein the upstream heat exchanger is located downstream of the HRSG and upstream of the at least one EGR fan; and wherein the exhaust stream flows from an outlet portion of the HRSG to an inlet portion of the upstream heat exchanger.

7. The system of claim 1, wherein the exhaust stream comprises a flowrate of about 10,000 pounds per hour to about 50,000,000 pounds per hour and a temperature of about 100 degrees Fahrenheit to about 1500 degrees Fahrenheit; wherein the at least one gas turbine controls cooperation of the combustion system and turbine section, which then collectively determine the magnitudes of the flowrate and the temperature.

8. The system of claim 1, wherein the exhaust gas recirculation system reduces the constituents within the exhaust stream from a first level to a second level, wherein the constituents comprise at least one of: NOx, CO2, water, chloride ions, acids, aldehydes, hydrocarbons, or combinations thereof.

9. The system of claim 1, wherein the at least one damper door comprises a plurality of damper doors for preventing a backflow of the exhaust stream into the at least one gas turbine.

10. The system of claim 1, wherein the first level of the SOx comprises a range of about 10 parts per billion by weight to about 100 parts per billion by weight.

11. The system of claim 1, wherein the second level of the SOx comprises a range of about 0.1 parts per billion by weight to about 20 parts per billion by weight.

12. The system of claim 1, further comprising:

at least one scrubber comprising an inlet portion and an outlet portion; wherein the inlet portion of the scrubber receives the exhaust stream from an outlet portion of the upstream heat exchanger; and wherein the outlet portion of the at least one scrubber allows for the at least one exhaust stream to flow to an inlet portion of the at least one EGR fan; and the at least one scrubber:

receives the at least one exhaust stream; and reduces constituents within the at least one exhaust stream from a first level to a second level, wherein the constituents comprise at least one of: NOx, CO2, water, chloride ions, acids, aldehydes, hydrocarbons, or combinations thereof; and wherein the at least one scrubber utilizes a scrubber fluid comprising fresh water.

13. The system of claim 12, wherein the temperature of the exhaust stream exiting the at least one scrubber is about 60 degrees Fahrenheit to about 100 degrees Fahrenheit; and wherein the temperature of the exhaust stream entering the inlet portion is about 35 degrees Fahrenheit to about 100 degrees Fahrenheit.

14. The system of claim 13, wherein the at least one scrubber is horizontally positioned and integrated with a recirculation tank, wherein the recirculation tank increases the flowrate of the exhaust stream.

15. The system of claim 14, wherein a discharge from the recirculation tank is used as a cooling fluid for the upstream heat exchanger.

16. The system of claim 15, further comprising at least one water purification device integrated with the recirculation tank; wherein the at least one water purification device reduces the level of impurities within the water.

17. The system of claim 1, further comprising:
at least one scrubber comprising an inlet portion and an outlet portion; wherein the inlet portion of the at least one scrubber receives the at least one exhaust stream from an outlet portion of the upstream heat exchanger; and wherein the outlet portion of the at least one scrubber allows for the at least one exhaust stream to flow to an inlet portion of the at least one EGR fan; and the at least one scrubber:
  receives the at least one exhaust stream; and
  reduces constituents within the at least one exhaust stream from a first level to a second level, wherein the constituents comprise at least one of: NOx, CO2, water, chloride ions, acids, aldehydes, hydrocarbons, or combinations thereof;
wherein the at least one scrubber utilizes a scrubber fluid comprising sea water.

18. the system of claim 17, wherein the temperature of the exhaust stream exiting the at least one scrubber is about 60 degrees Fahrenheit to about 100 degrees Fahrenheit; and wherein the temperature of the exhaust stream entering the inlet portion is about 35 degrees Fahrenheit to about 100 degrees Fahrenheit.

19. The system of claim 18, wherein the at least one scrubber is horizontally positioned, and wherein a discharge from the scrubber is integrated with a cooling fluid of the upstream heat exchanger.

20. The system of claim 19, further comprising:
at least one water treatment device integrated with the at least one scrubber; and at least one filter, wherein the at least one filter is located downstream of the at least one EGR fan.

21. The system of claim 1, further comprising:
at least one scrubber comprising an inlet portion and an outlet portion; wherein the inlet portion of the at least one scrubber receives the exhaust stream from an outlet portion of the upstream heat exchanger; and wherein the outlet portion of the at least one scrubber allows the exhaust stream to flow to an inlet portion of the at least one EGR fan; and the at least one scrubber:
  receives the at least one exhaust stream; and
  reduces constituents within the exhaust stream from a first level to a second level, wherein the constituents comprise at least one of: NOx, CO2, water, chloride ions, acids, aldehydes, hydrocarbons, or combinations thereof; and
a downstream heat exchanger; wherein the downstream heat exchanger is located downstream of an outlet portion of the at least one scrubber and upstream of the at least one EGR fan;
wherein the downstream heat exchanger reduces the temperature of the exhaust stream;
wherein the temperature of the exhaust stream exiting the upstream heat exchanger is about 120 degrees Fahrenheit to about 150 degrees Fahrenheit; and
wherein the temperature of the exhaust stream exiting the downstream heat exchanger is about 60 degrees Fahrenheit to about 100 degrees Fahrenheit.

22. The system of claim 21, wherein the at least one scrubber utilizes a scrubber fluid comprising fresh water, sea water, or combinations thereof.

23. The system of claim 1, further comprising:
at least one scrubber comprising an inlet portion and an outlet portion; wherein the inlet portion of the at least one scrubber receives the exhaust stream from an outlet portion of the upstream heat exchanger; and wherein the outlet portion of the at least one scrubber allows the one exhaust stream to flow to an inlet portion of the at least one EGR fan; and the at least one scrubber:
  receives the exhaust stream comprising sulfur oxides emissions at a first level; and
  reduces constituents within the exhaust stream from a first level to a second level, wherein the constituents comprise at least one of: NOx, CO2, water, chloride ions, acids, aldehydes, hydrocarbons, or combinations thereof; and
a bypass stack connected downstream of an exhaust portion of the at least one gas turbine and upstream of the HRSG; wherein the bypass stack is integrated with the exhaust gas recirculation system; and
  wherein the at least damper door comprises a plurality of damper doors integrated with the bypass stack to prevent a backflow of the at least one exhaust stream.

24. The system of claim 23, wherein the at least one scrubber utilizes a scrubber fluid comprising fresh water, sea water, or combinations thereof.

25. The system of claim 6, wherein the second level of the SOx comprises a range of about 0.1 parts per billion by weight to about 20 parts per billion by weight.

* * * * *